M. G. HUBBARD.
Wagon-Spring.

No. 15,885.

Patented Oct. 14, 1856.

Inventor:
M. G. Hubbard

UNITED STATES PATENT OFFICE.

M. G. HUBBARD, OF PENN YAN, NEW YORK.

ARRANGEMENT OF SPRINGS FOR SIDE-SPAR WAGONS.

Specification of Letters Patent No. 15,885, dated October 14, 1856.

*To all whom it may concern:*

Be it known that I, M. G. HUBBARD, of Penn Yan, in the county of Yates and State of New York, have invented certain new and useful Improvements in Side-Spar-Wagon Springs; and I do hereby describe and ascertain the nature of said invention as follows, reference being had to the accompanying drawing, in which—

Figure 2:
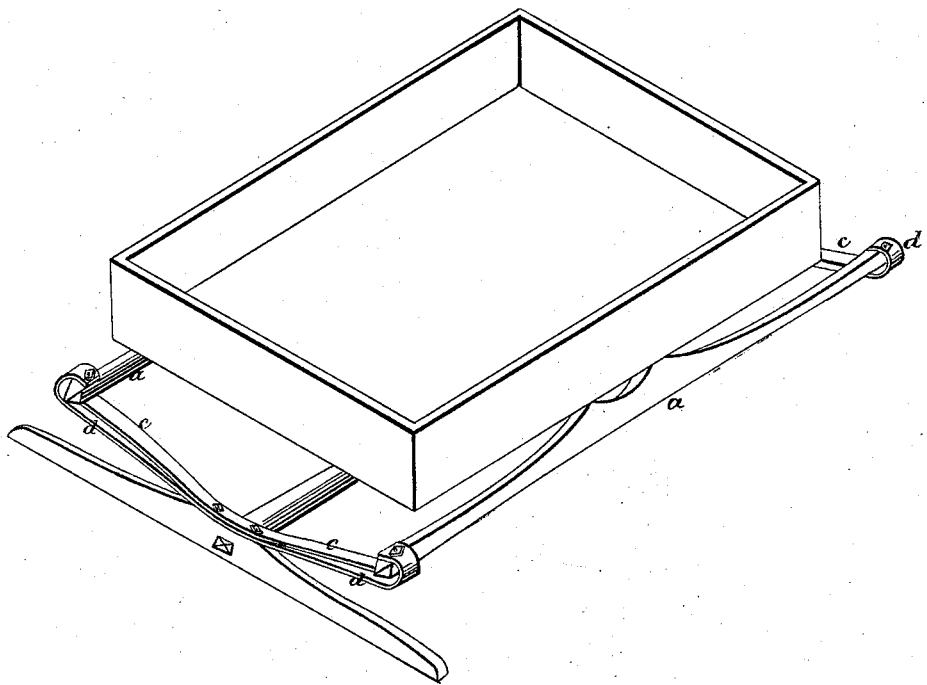
Figure 1:
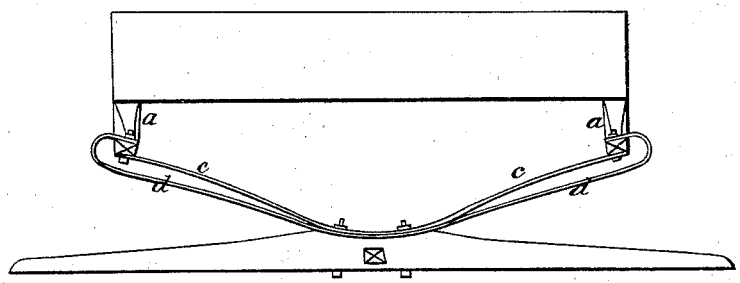

Figure 1 is a cross elevation of the rear end of the wagon. Fig. 2 is a general view.

A favorite style of modern wagon now in use is what is known as the side spar wagon, from being supported on two light wooden spars affixed at the center of each of the sides and extending from end to end of the wagon body, parallel with the sides, as clearly shown at $a$ in the drawing. The prominent objection to this device was the impossibility to make a secure and permanent attachment of the semielliptic springs to these spars. This has heretofore been done by putting a bolt through the end of the leaves of the springs and the spars, but the twisting action soon destroyed the connection and split the spar.

To remedy this defect is the object of my device; and it consists simply in separating two long leaves or semielliptic springs and attaching the upper one $c$ to the under side of the spar and then extending the lower one $d$ out and curving it around bring it upon the top of the spar directly over the end of the lower spring leaf. A single bolt passing through the two leaves and the spar is found to relieve the latter of the objectionable twisting strain and makes a solid and endurable fixture without increasing the expense of the vehicle or the difficulty of its construction and also the springs are far less liable to become set or bent.

Having thus fully described my improvement in side spar wagons what I claim as new is—

The mode herein described of combining the two semielliptic springs with the side spars of light wagons by bringing one above and the other below the end of said spar.

M. G. HUBBARD.

Witnesses present:
  D. W. BATEMAN,
  JNO. PENDLETON.